US009367189B2

(12) United States Patent
Morein et al.

(10) Patent No.: US 9,367,189 B2
(45) Date of Patent: Jun. 14, 2016

(54) COMPENSATING FOR SOURCE LINE INTERFERENCE

(71) Applicant: SYNAPTICS INCORPORATED, San Jose, CA (US)

(72) Inventors: Stephen L. Morein, San Jose, CA (US); Petr Shepelev, Campbell, CA (US); Joseph Kurth Reynolds, Alviso, CA (US); Jeffrey Lukanc, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 171 days.

(21) Appl. No.: 14/319,635

(22) Filed: Jun. 30, 2014

(65) Prior Publication Data

US 2015/0309612 A1    Oct. 29, 2015

Related U.S. Application Data

(60) Provisional application No. 61/986,065, filed on Apr. 29, 2014.

(51) Int. Cl.
*G06F 3/044* (2006.01)
*G06F 3/041* (2006.01)

(52) U.S. Cl.
CPC .............. *G06F 3/044* (2013.01); *G06F 3/0416* (2013.01)

(58) Field of Classification Search
None
See application file for complete search history.

(56) References Cited

U.S. PATENT DOCUMENTS

| 7,417,441 | B2 | 8/2008 | Reynolds |
| 7,583,092 | B2 | 9/2009 | Reynolds et al. |
| 2008/0062148 | A1 | 3/2008 | Hotelling et al. |
| 2010/0001973 | A1 | 1/2010 | Hotelling et al. |
| 2010/0193257 | A1 | 8/2010 | Hotelling et al. |
| 2010/0194695 | A1 | 8/2010 | Hotelling et al. |
| 2010/0238134 | A1* | 9/2010 | Day ..................... G06F 3/0412 345/174 |
| 2010/0295824 | A1* | 11/2010 | Noguchi ............. G02F 1/13338 345/175 |
| 2010/0328591 | A1* | 12/2010 | Oh ...................... G02F 1/13439 349/114 |
| 2011/0284949 | A1 | 11/2011 | Meng et al. |
| 2011/0298746 | A1 | 12/2011 | Hotelling |
| 2012/0019474 | A1* | 1/2012 | Hsieh .................... G06F 3/0418 345/174 |
| 2012/0068961 | A1* | 3/2012 | Mizuhashi ........... G06F 3/0412 345/174 |

(Continued)

OTHER PUBLICATIONS

Phillippe Lambinet, FOGALE nanotech, presentation materials dared, May 22, 2013, France.

(Continued)

*Primary Examiner* — Kent Chang
*Assistant Examiner* — Benjamin Morales Fernande
(74) *Attorney, Agent, or Firm* — Patterson + Sheridan, LLP (57) ABSTRACT

Embodiments of the present invention generally provide an input device including a display device having an integrated capacitive sensing device. The input device includes a plurality of source lines, a plurality of routing traces coupled to a plurality of sensor electrodes, and a processing system. The processing system is configured to update a first sub-pixel coupled to a first source line by driving the first source line with a first voltage. The processing system is further configured to drive one or more routing traces included in the plurality of routing traces with a second voltage that is an inverted version of the first voltage. The processing system is further configured to receive resulting signals from at least one sensor electrode via the one or more routing traces while the one or more routing traces are driven with the second voltage, and determine positional information based on the resulting signals.

25 Claims, 9 Drawing Sheets

(56) References Cited

U.S. PATENT DOCUMENTS

2012/0182251 A1 7/2012 Krah
2013/0215075 A1 8/2013 Lee et al.
2013/0321296 A1 12/2013 Lee et al.

OTHER PUBLICATIONS

U.S. Appl. No. 14/067,792.

* cited by examiner

COMPENSATING FOR SOURCE LINE INTERFERENCE

CROSS-REFERENCE TO RELATED APPLICATIONS

This application claims benefit of U.S. provisional patent application Ser. No. 61/986,065, filed Apr. 29, 2014, which is hereby incorporated herein by reference.

BACKGROUND OF THE INVENTION

1. Field of the Invention

Embodiments of the present invention generally relate to techniques for compensating for source line interference in an integrated input device.

2. Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location, and/or motion of one or more input objects. Proximity sensor devices may be used to provide interfaces for the electronic system. For example, proximity sensor devices are often used as input devices for larger computing systems, such as touchpads integrated in, or peripheral to, notebook or desktop computers. Proximity sensor devices are also often used in smaller computing systems, such as touch screens integrated in cellular phones or tablet computers.

Proximity sensor devices may include one or more types of electrodes configured for updating display lines and/or transmitting input sensing signals. In such devices, in order to increase the amount of time available for performing display updating and/or input sensing, display updating and input sensing may be performed simultaneously during the same time periods. However, when electrodes used for display updating are positioned near electrodes used for input sensing, interference may be generated between the electrodes. Such interference may reduce the signal-to-noise ratio of input sensing signals received by the device and, as a result, negatively impact the accuracy of input sensing.

Therefore, there is a need for an improved technique for performing display updating and input sensing in proximity sensor devices.

SUMMARY OF THE INVENTION

Embodiments of the present invention generally provide an input device including a display device having an integrated capacitive sensing device. The input device includes a plurality of source lines, a plurality of routing traces coupled to a plurality of sensor electrodes, and a processing system coupled to the plurality of source lines and the plurality of routing traces. The processing system is configured to update a first sub-pixel coupled to a first source line included in the plurality of source lines by driving the first source line with a first voltage. The processing system is further configured to drive one or more routing traces included in the plurality of routing traces with a second voltage that is an inverted version of the first voltage. The processing system is further configured to receive resulting signals from at least one sensor electrode included in the plurality of sensor electrodes via the one or more routing traces while the one or more routing traces are driven with the second voltage, and to determine positional information based on the resulting signals.

Embodiments of the present invention may further provide a method of input sensing with a display device having an integrated capacitive sensing device and including a plurality of source lines and a plurality of sensor electrodes. The method includes updating a first sub-pixel coupled to a first source line included in the plurality of source lines by driving the first source line with a first voltage. The method further includes driving one or more sensor electrodes included in the plurality of sensor electrodes with a second voltage that is an inverted version of the first voltage. The method further includes receiving resulting signals from the one or more sensor electrodes while the one or more sensor electrodes are driven with the second voltage, and determining positional information based on the resulting signals.

Embodiments of the present invention may further provide a processing system for a display device having an integrated sensing device. The processing system includes a driver module having driver circuitry, a sensor module coupled to a plurality of routing traces, each routing trace being coupled to a sensor electrode included in a plurality of sensor electrodes, and a determination module. The driver module is coupled to a plurality of source lines and is configured for updating a first sub-pixel coupled to a first source line included in the plurality of source lines by driving the first source line with a first voltage. The sensor module is configured for receiving resulting signals with at least one sensor electrode included in the plurality of sensor electrodes via one or more routing traces included in the plurality of routing traces while the one or more routing traces are driven with the second voltage. The second voltage is an inverted version of the first voltage. The determination module is configured for determining positional information based on the resulting signals.

BRIEF DESCRIPTION OF THE DRAWINGS

So that the manner in which the above recited features can be understood in detail, a more particular description, briefly summarized above, may be had by reference to embodiments, some of which are illustrated in the appended drawings. It is to be noted, however, that the appended drawings illustrate only embodiments of the invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention generally provide a system and method for mitigating electrode interference when performing input sensing and display updating in an integrated input device. In particular, a source line signal that is transmitted via a source line during display updating may be inverted and transmitted to one or more receiver electrodes that are proximate to the source line. The inverted signal may also be amplified and/or phase shifted in order to more effectively cancel interference received from the source line by the receiver electrode(s). Advantageously, the system and method described herein enable interference to be reduced when source lines and receiver electrodes are used to perform display updating and input sensing, respectively, in a simultaneous or overlapping manner.

Figure 1:
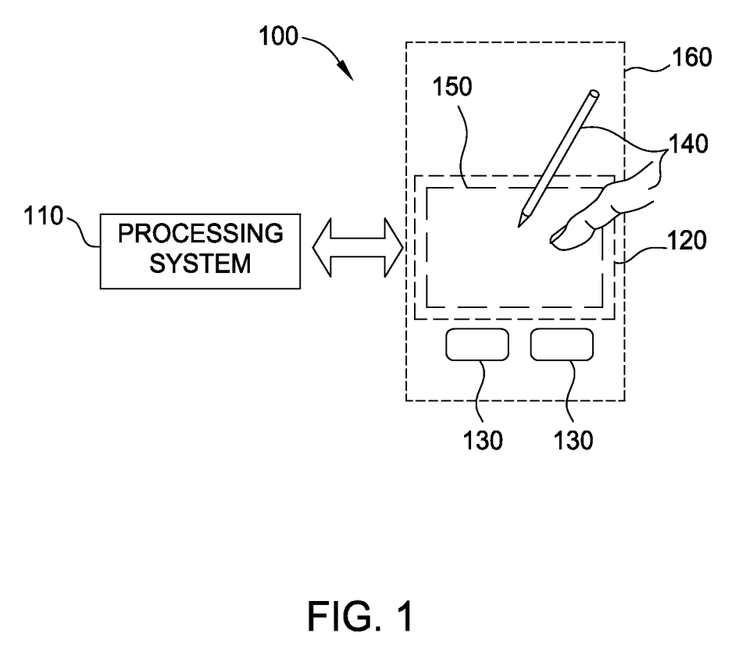
FIG. 1 is a block diagram of an exemplary input device in accordance with embodiments of the invention.

Turning now to the figures, FIG. 1 is a block diagram of an exemplary input device 100 in accordance with embodiments of the invention. The input device 100 comprises a display device 160 having an integrated sensing device, such as a capacitive sensing device. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional examples of electronic systems include composite input devices, such as physical keyboards that include the input device 100 and separate joysticks or key switches. Further exemplary electronic systems include peripherals, such as data input devices (including remote controls and mice) and data output devices (including display screens and printers). Other examples include remote terminals, kiosks, and video game machines (e.g., video game consoles, portable gaming devices, and the like). Other examples include communication devices (including cellular phones, such as smart phones) and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system or can be physically separate from the electronic system. As appropriate, the input device 100 may communicate with parts of the electronic system using any one or more of the following: buses, networks, and other wired or wireless interconnections (including serial and/or parallel connections). Examples include I²C, SPI, PS/2, Universal Serial Bus (USB), Bluetooth, RF, and IRDA.

In the embodiment depicted in FIG. 1, the input device 100 is shown as a proximity sensor device (also often referred to as a "touchpad" or a "touch sensor device") configured to sense input provided by one or more input objects 140 in a sensing region 120. Examples of input objects 140 include fingers and styli, as shown in FIG. 1.

Sensing region 120 overlays the display screen of the display device 160 and encompasses any space above, around, in, and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100. The face sheet (e.g., an LCD lens) may provide a useful contact surface for an input object.

The input device 100 may utilize any combination of sensor components and sensing technologies to detect user input in the sensing region 120. The input device 100 comprises one or more sensing elements for detecting user input. Some implementations are configured to provide images that span one, two, three, or higher dimensional spaces. Some implementations are configured to provide projections of input along particular axes or planes. Cursors, menus, lists, and items may be displayed as part of a graphical user interface and may be scaled, positioned, selected scrolled, or moved.

In some capacitive implementations of the input device 100, voltage or current is applied to create an electric field. Nearby input objects cause changes in the electric field and produce detectable changes in capacitive coupling that may be detected as changes in voltage, current, or the like.

Some capacitive implementations utilize arrays or other regular or irregular patterns of capacitive sensing elements 150, such as sensor electrodes, to create electric fields. In some capacitive implementations, separate sensing elements 150 may be ohmically shorted together to form larger sensor electrodes. Some capacitive implementations utilize resistive sheets (e.g., may comprise a resistive material such as ITO or the like), which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, changing the measured capacitive coupling. In one implementation, an absolute capacitance sensing method operates by modulating sensor electrodes with respect to a reference voltage (e.g., system ground) and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals and/or to one or more sources of environmental interference (e.g., other electromagnetic signals). Sensor electrodes may be dedicated transmitters or receivers, or sensor electrodes may be configured to both transmit and receive. Alternatively, the receiver electrodes may be modulated relative to ground.

In some touch screen embodiments, transmitter electrodes comprise one or more common electrodes (e.g., "V-com electrode") used in updating the display (e.g., display lines) of the display screen. These common electrodes may be disposed on an appropriate display screen substrate. For example, the common electrodes may be disposed on the TFT glass in some display screens (e.g., in-plane switching (IPS) or plane-to-line switching (PLS)), on the bottom of the color filter glass of some display screens (e.g., patterned vertical alignment (PVA) or multi-domain vertical alignment (MVA)), configured to drive an organic light emitting diode OLED display, etc. In such embodiments, the common electrode can also be referred to as a "combination electrode," since it performs multiple functions. In various embodiments, two or more transmitter electrodes may share one or more common electrodes. In addition, other display elements, such as source drivers, gate select lines, storage capacitors, and the like, may be used to perform capacitive sensing.

In other touch screen embodiments, the sensing elements 150 may be formed as discrete geometric forms, polygons, bars, pads, lines, or other shapes that are ohmically isolated from one another. When formed as discrete geometric elements, the sensing elements 150 may be driven using absolute sensing and/or transcapacitance sensing methods. The sensing elements 150 may be electrically coupled through circuitry to form electrodes of having larger plan area relative to the individual sensing elements 150. The sensing elements 150 may be formed as a contiguous body of conductive material having little or no open area (i.e., having a planar surface uninterrupted by holes) or may alternatively be fabricated to form a body of material having openings formed therethrough. For example, the sensing elements 150 may be formed from a mesh of conductive material, such as a plurality of interconnected thin metal wires. Additionally, the sensing electrodes 150 may include a grid electrode. The grid electrode may be disposed between at least two discrete sensing elements 150 and/or may at least partially circumscribe one or more discrete sensing elements 150. In some embodiments, the grid electrode may be a planar body having a plurality of apertures, where each aperture circumscribes a discrete sensing element 150. The grid electrode may also be segmented.

In FIG. 1, a processing system 110 is shown as part of the input device 100. The processing system 110 is configured to operate the hardware of the input device 100 to detect input in the sensing region 120. The sensing region 120 includes an array of sensing elements 150. The processing system 110 comprises parts of, or all of, one or more integrated circuits (ICs) and/or other circuitry components. For example, a processing system for a mutual capacitance sensor device may comprise transmitter circuitry configured to transmit signals with transmitter sensor electrodes and/or receiver circuitry configured to receive signals with receiver sensor electrodes. In some embodiments, the processing system 110 also comprises electronically-readable instructions, such as firmware code, software code, and the like. In some embodiments, components of the processing system 110 are located together, such as near sensing element(s) of the input device 100. In other embodiments, components of processing system 110 are physically separate from one or more components close to sensing element(s) of input device 100 and one or more components elsewhere. For example, the input device 100 may be a peripheral coupled to a desktop computer, and the processing system 110 may include software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. In further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120 or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 of the sensing device overlaps at least part of an active area of a display screen of the display device 160. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As one example, a common electrode may be utilized to update a display line during a display update period and utilized to perform input sensing during a non-display period. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2A:
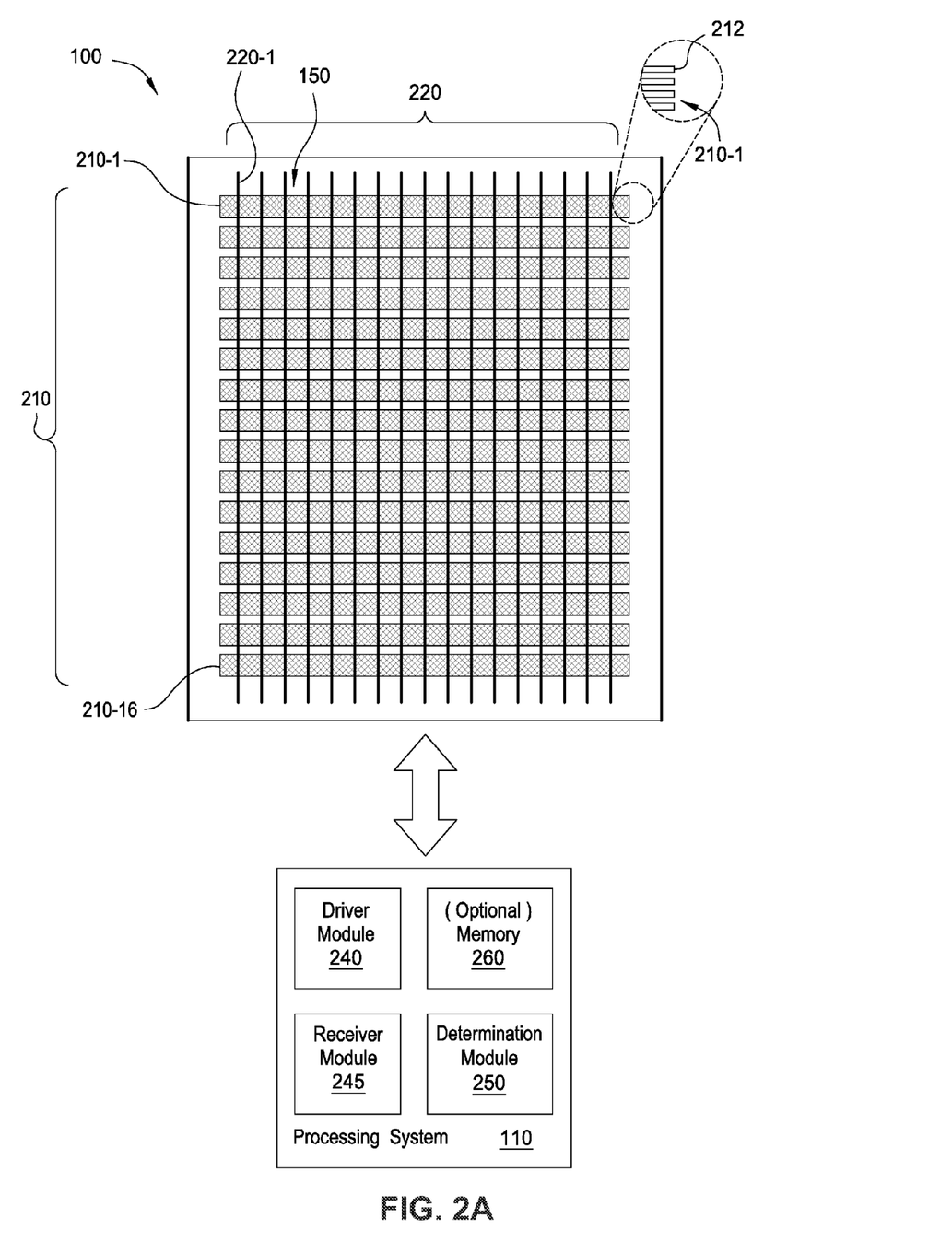
FIG. 2A is a partial schematic plan view of the input device of FIG. 1 in accordance with embodiments of the invention.

FIG. 2A is a partial schematic plan view of the input device 100 of FIG. 1 in accordance with embodiments of the invention. The input device 100 includes an array of sensing elements 150 and processing system 110. The array of sensing elements 150 may include a plurality of sensor electrodes that are configured to perform transcapacitive sensing, absolute sensing, and/or matrix sensing. In some embodiments, the sensor electrodes include a plurality of transmitter electrodes 210 (e.g., 210-1, 210-2, 210-3, etc.) and a plurality of receiver electrodes 220 (e.g., 220-1, 220-2, 220-3, etc.). Each transmitter electrode 210 may comprise one or more common electrodes 212. Although the transmitter electrodes 210 and receiver electrodes 220 are illustrated as being rectangular, in other embodiments, the transmitter electrodes 210 and receiver electrodes 220 may be any practical geometric shape. Additionally, in various embodiments, each receiver electrode 220 may comprise one or more common electrodes. The processing system 110 is coupled to the array of sensing elements 150, for example, through one or more routing traces (not shown). In some embodiments, the transmitter electrodes 210 and receiver electrodes 220 may be configured to perform transcapacitive sensing, while in other embodiments, any of the sensor electrodes described herein as transmitter electrodes 210 and/or receiver electrodes 220 may instead by configured as absolute sensor electrodes and/or sensor electrodes that are configured to perform both transcapacitive sensing and absolute sensing.

The sensing elements 150 may be formed on a substrate that is external to the display device 160. For example, the receiver electrodes 220 may be disposed on the outer surface of a lens of the input device 100, between the color filter glass of the display device 160 and the lens of the input device 100, or between a thin film transistor substrate (TFT substrate) and the color filter glass of the display device 160. In such embodiments, the transmitter electrodes 210 may include one or more common electrodes 212, such as one or more segments of a Vcom electrode, a source line, gate line, an anode sub-pixel electrode, cathode pixel electrode, or any other display element that is used for both display updating and input sensing. In other embodiments, both the transmitter electrodes 210 and the receiver electrodes 220 include one or more common electrodes 212, such as common electrodes disposed on the TFT substrate and/or color filter glass.

Although the processing system 110 is illustrated in FIG. 2A embodied as a single integrated circuit (IC) (e.g., an integrated controller), the processing system 110 may include any appropriate number of ICs. The processing system 110 may be configured to perform one or more input sensing operations, such as driving sensor electrodes, transmitting input sensing signals, receiving resulting signals, determining positional information, and the like. As shown in FIG. 2, in some embodiments, the processing system 110 may include separate modules that perform one or more of the above operations. For example, the processing system 110 may include a driver module 240, a receiver module 245, a determination module 250, an optional memory 260, and/or a synchronization mechanism (not shown in FIG. 2).

The driver module 240 includes driver circuitry and may be configured for updating images on the display screen of the display device 160. For example, the driver circuitry may be configured to apply one or more pixel voltages to the display pixel electrodes through pixel source drivers. The driver circuitry may also be configured to apply one or more common drive voltages to the common electrodes 212 to update one or more display lines of the display screen. In addition, the processing system 110 is configured to operate the common electrodes 212 as transmitter electrodes 210 for input sensing by driving transmitter signals onto the common electrodes 212.

The receiver module 245 is coupled to the plurality of receiver electrodes 220 and configured to receive resulting signals from the receiver electrodes 220 indicative of input (or lack of input) in the sensing region 120 and/or of environmental interference. The receiver module 245 may also be configured to pass the resulting signals to the determination module 250 for determining the presence of an input object and/or to the optional memory 260 for storage. In some embodiments, the receiver module 245 is configured to receive resulting signals while the processing system 110 is not actively transmitting input sensing signals with the transmitter electrodes 210. For example, during such time periods, the receiver electrodes 220 may be configured to receive noise (e.g., to determine a baseline interference value) and/or a signal from an active input object 140 capable of transmitting a transmitter signal, such as an active pen capable of transmitting an active pen signal. Additionally, the receiver module 245 and/or driver module 240 may be configured to drive a modulated signal onto the at least one sensing element 150 to detect changes in absolute capacitance between the at least one sensor electrode and an input object 140.

The functions of the processing system 110 may be implemented in more than one IC to control the display device 160 elements (e.g., common electrodes 212) and drive transmitter signals and/or receive resulting signals received from the array of sensing elements 150. For example, one IC may be configured to perform input sensing and another IC may be configured to perform display updating. In other embodiments, one IC may be configured to perform the functions of the driver module 240, and another IC may be configured to perform the functions of the receiver module 245. In embodiments where there is more than one IC, communications between separate ICs of the processing system 110 may be achieved through a synchronization mechanism, which sequences the signals provided to the common electrodes. Alternatively the synchronization mechanism may be internal to any one of the ICs.

Transmitter electrodes 210 and receiver electrodes 220 are ohmically isolated from each other by one or more insulators which separate the transmitter electrodes 210 from the receiver electrodes 220 and prevent them from electrically shorting to each other. The electrically insulative material separates the transmitter electrodes 210 and the receiver electrodes 220 at cross-over areas at which the electrodes intersect. In one such configuration, the transmitter electrodes 210 and/or receiver electrodes 220 are formed with jumpers connecting different portions of the same electrode. In other configurations, the transmitter electrodes 210 and the receiver electrodes 220 are separated by one or more layers of electrically insulative material or by one or more substrates, as described in further detail below. In still other configurations, the transmitter electrodes 210 and the receiver electrodes 220 are optionally disposed on a single layer of the input device 100.

The areas of localized capacitive coupling between transmitter electrodes 210 and receiver electrodes 220 may be termed "capacitive pixels." The capacitive coupling between the transmitter electrodes 210 and receiver electrodes 220 changes with the proximity and motion of input objects in the sensing region 120 associated with the transmitter electrodes 210 and the receiver electrodes 220. In other embodiments, such as embodiments that include matrix sensors, the term "capacitive pixels" may refer to the localized capacitance (e.g., absolute capacitance) between a sensing element 150 and an input object 140.

In some embodiments, the sensor pattern is "scanned" to determine these capacitive couplings. That is, the transmitter electrodes 210 are driven to transmit transmitter signals. Transmitters may be operated such that one transmitter electrode 210 transmits at one time, or multiple transmitter electrodes 210 transmit at the same time. Where multiple transmitter electrodes 210 transmit simultaneously, these multiple transmitter electrodes 210 may transmit the same transmitter signal and effectively produce an effectively larger transmitter electrode 210, or these multiple transmitter electrodes 210 may transmit different transmitter signals. For example, multiple transmitter electrodes 210 may transmit different transmitter signals according to one or more coding schemes that enable their combined effects on the resulting signals of receiver electrodes 220 to be independently determined. Additionally, in embodiments that implement matrix sensing techniques, the sensing elements 150 may be scanned to sense changes to absolute capacitance on the electrodes.

The receiver electrodes 220 may be operated singly or multiply to acquire resulting signals. The resulting signals may be used to determine measurements of the capacitive couplings at the capacitive pixels.

Figure 2B:
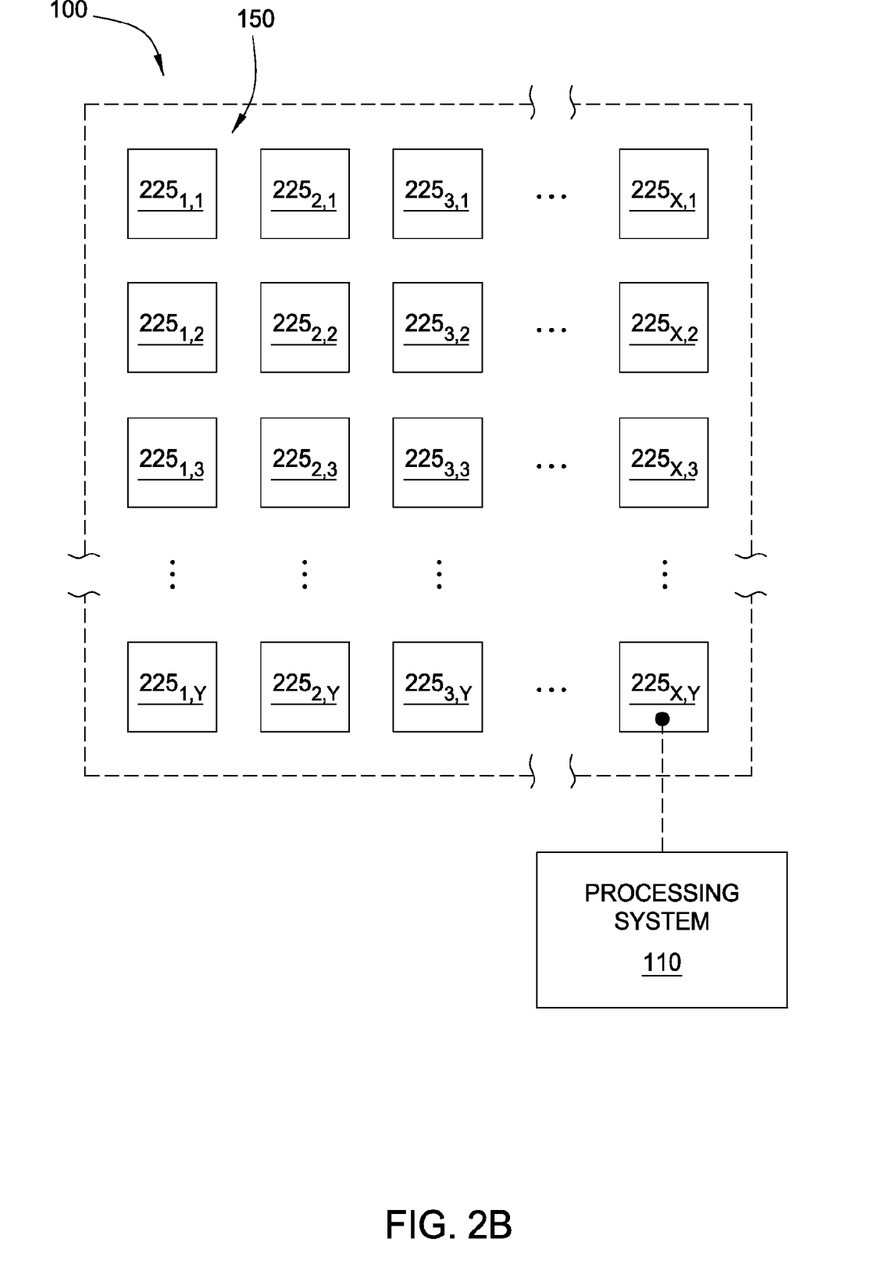
FIG. 2B is a partial schematic plan view of a pattern of capacitive pixels that may be included in the input device of FIG. 1 in accordance with embodiments of the invention.

FIG. 2B is a partial schematic plan view of a pattern of capacitive pixels 225 that may be included in the input device 100 of FIG. 1 in accordance with embodiments of the invention. In some embodiments, each capacitive pixel 225 may be coupled to the processing system 110 via a different sensor electrode, such that distinct input sensing signals can be transmitted and/or acquired by each capacitive pixel 225. In other embodiments, multiple capacitive pixels 225 may be coupled to the processing system 110 via a single sensor electrode. For clarity of illustration and description, FIG. 2B illustrates the capacitive pixels 225 as a matrix of simple rectangles and omits other features that may be included within the capacitive pixels 225. In one embodiment, the capacitive pixels 225 are areas of localized capacitance (e.g., capacitive coupling) that are used to perform matrix sensing. In some embodiments, capacitive pixels 225 may be formed between a sensor electrode and a ground electrode and/or between multiple sensor electrodes (e.g., transmitter electrodes and receiver electrodes).

The exemplary pattern shown in FIG. 2B includes an array of capacitive pixels $225_{X,Y}$ arranged in a matrix of X columns and Y rows, where X and Y are positive integers. It is contemplated that the pattern of capacitive pixels 225 may configured in other ways, such as in polar arrays, repeating patterns, non-repeating patterns, non-uniform arrays, a single row or column, or other suitable arrangements. As shown here, the capacitive pixels 225 are coupled to the processing system 110 and utilized to determine the presence (or lack thereof) of an input object 140 in the sensing region 120.

In some embodiments, one or more capacitive pixels 225 may be used to detect the presence of an input object 140 via absolute sensing techniques. For example, a module (e.g., driver module 240) included in the processing system 110 may be configured to drive the capacitive pixels 225 with a modulated signal and measure the capacitance between the capacitive pixels 225 and an input object 140 to determine the position of the input object 140. In other embodiments, the capacitive pixels 225 are used to detect the presence of an input object 140 via transcapacitive sensing techniques. For example, the processing system 110 may drive one or more capacitive pixels 225 with a transmitter signal and receive resulting signals using one or more capacitive pixels 225. In some embodiments, one or more sensor electrodes coupled to the capacitive pixels 225 include one or more common electrodes 212 that are used to update the display device 160.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region. Capacitive images may be acquired using one or more sensing techniques, including transcapacitive sensing, absolute sensing, and matrix sensing techniques. For example, a capacitive image may be received from a plurality of matrix sensor electrodes that are driven simultaneously and/or driven by scanning individual matrix sensor electrodes in a particular pattern. Additionally, in various embodiments, a capacitive image may be acquired using more than one sensing technique and/or using sensor electrodes disposed along one or more axes of the input device 100.

Figure 3:
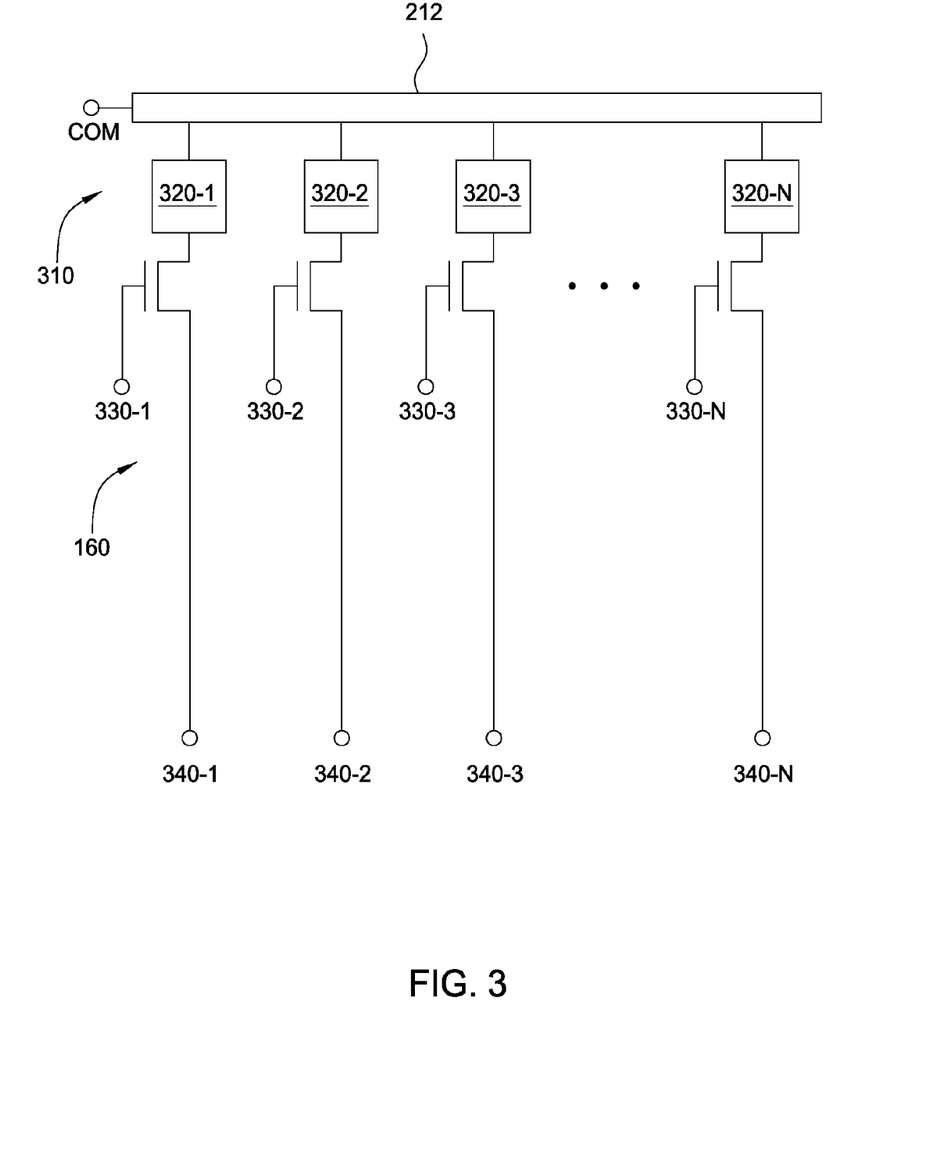
FIG. 3 is a partial schematic view of the display device coupled to a common electrode in the input device of FIG. 2.

FIG. 3 is a partial schematic view of the display device 160 coupled to a common electrode 212 in the input device 100 of FIG. 2. The display device 160 includes a plurality of display rows 310, with each display row 310 including a plurality of sub-pixels 320-1, 320-2, 320-3, . . . , 320-N (collectively "sub-pixels 320") and sub-pixel circuitry configured for display updating. The sub-pixel circuitry associated with each sub-pixel 320 may include a select line 330 (e.g., 330-1, 330-2, 330-3, . . . , 330-N) and a source line 340 (e.g., 340-1, 340-2, 340-3, . . . , 340-N). A select signal may be received by a select line 330 to select one or more sub-pixels 320 for display updating. The selected sub-pixel(s) 320 may then be driven with a source voltage received by the source line 340-N and/or a common voltage received by the common electrode 212.

Although the embodiment illustrated in FIG. 3 includes a separate select line 330 for each sub-pixel 320, in other embodiments, each select line 330 may be configured to select more than one sub-pixel 320 at a time. For example, in one embodiment, a select line 330 may select an entire display row 310 for updating (e.g., sub-pixels 320-1 through 320-N). In other embodiments, a select line 330 may select one or more types of sub-pixels 320, for example, sub-pixels 320 associated with a specific pixel color component (e.g., red, green, blue, yellow, white, etc.) or sub-pixels which comprise one or more pixels.

Once a sub-pixel 320 is selected, a source voltage may be received by the source line 340 to charge the sub-pixel to a predetermined level (e.g., a target voltage or current). The predetermined level may be associated with a desired brightness level of the sub-pixel 320. In other embodiments, one or more sub-pixels 320 may be coupled to a single source line 340 (e.g., through a logic circuit) in order to enable the one or more sub-pixels 320 to be charged to the same predetermined level. In various embodiments, the source voltage may be a substantially constant voltage. In other embodiments, the source voltage may transition between at least two voltages.

The common electrode 212 may be configured to provide a common voltage to the sub-pixels 320. Although the common electrode 212 is illustrated as a single, continuous electrode, in other embodiments, the common electrode 212 may be divided into a plurality of segments, with each segment providing a common voltage to one or more sub-pixels 320. Additionally, in various embodiments, the common electrode 212 may be configured to serve as a transmitter electrode 210, receiver electrode 220, or other type of sensor electrode (e.g., a capacitive pixel 225) that performs transcapacitive sensing, absolute sensing, or matrix sensing.

Figure 4A:
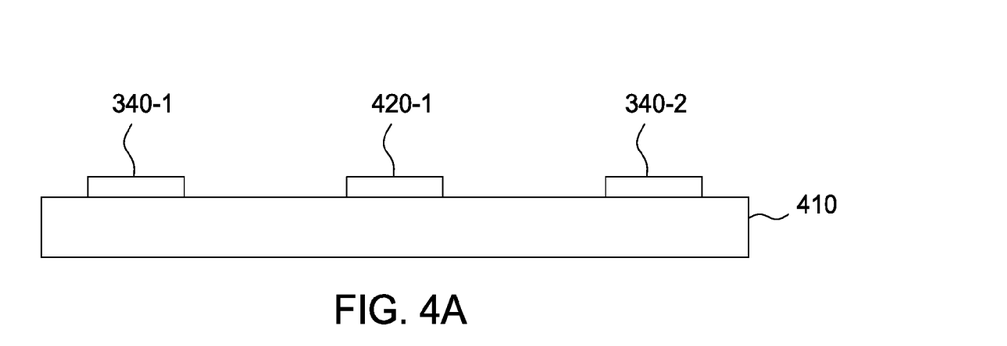
FIGS. 4A-4C illustrate a partial schematic cross-sectional view of a substrate included in the display device of FIG. 1 on which sources lines and receiver electrodes are disposed in accordance with embodiments of the invention.
Figure 4B:
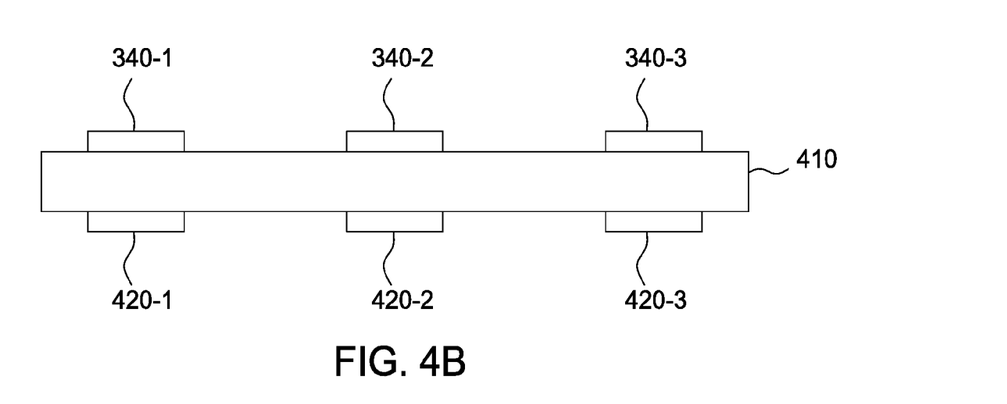
Figure 4C:
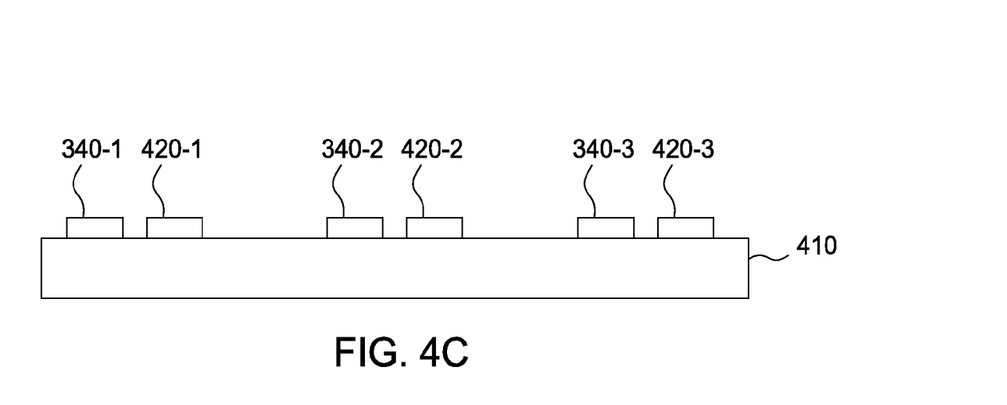

In various embodiments, display updating and input sensing may be performed simultaneously by the input device 100 during the same time periods. However, performing display updating while simultaneously performing inputting sensing may negatively impact the accuracy of input sensing. For example, when source lines 340 are disposed proximate to sensor electrodes, driving the source lines 340 for display updating may interfere with input sensing signals received by the sensor electrodes. Several exemplary configurations are shown in FIGS. 4A-4C, which illustrate a partial schematic cross-sectional view of a substrate 410 included in the display device of FIG. 1 on which sources lines 340 and sensor electrodes 420 are disposed in accordance with embodiments of the invention. As shown, the source lines 340 and sensor electrodes 420 may be substantially parallel to one another. In other embodiments, the source lines 340 and sensor electrodes 420 may be at an angle relative to one another (e.g., non-parallel). Additionally, the source lines 340 and sensor electrodes 420 may be disposed on the same side of the same substrate 410 and/or on different sides of the same substrate 410. In other embodiments, the source lines 340 and sensor electrodes 420 may be disposed proximate to each other, but on different substrates. In the embodiments described below, the sensor electrodes 420 may include any type of sensor electrode 420 described above, including the transmitter electrodes 210, receiver electrodes 220, capacitive pixels 225, and other types of sensor electrodes 420 that are configured to perform transcapacitive sensing, absolute sensing, and/or matrix sensing.

Due to the proximity between the source lines 340 and the sensor electrodes 420, signals transmitted via the source lines 340 may generate interference in the sensor electrodes 420, negatively impacting input sensing performance. Accordingly, signals may be transmitted to the sensor electrodes 420 to compensate for interference produced by the source lines 340, as described below in further detail in conjunction with FIGS. 5-7.

Compensating For Source Line Interference

Figure 5A:
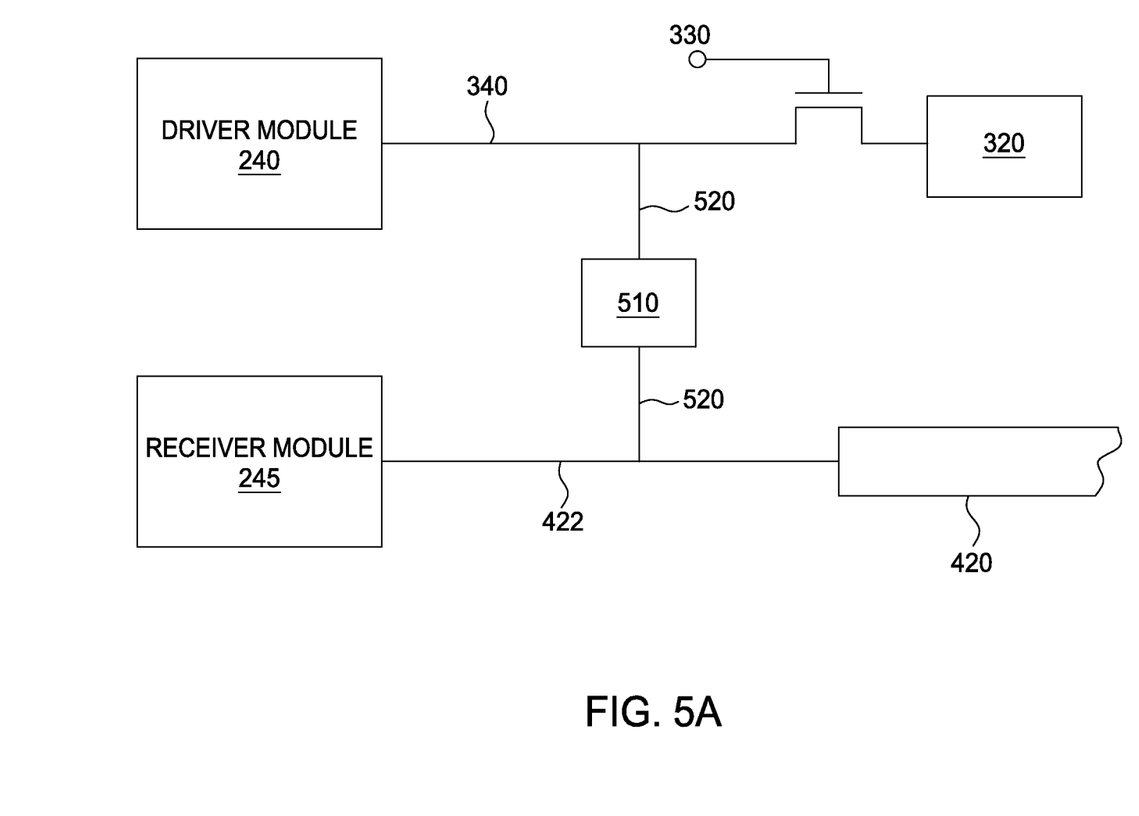
FIG. 5A illustrates a partial schematic diagram of an inverter circuit coupled between a source line and a receiver electrode included in the input device of FIG. 1 in accordance with embodiments of the invention.

FIG. 5A illustrates a partial schematic view of an inverter circuit 510 coupled between a source line 340 and a sensor electrode 420 included in the input device 100 of FIG. 1 in accordance with embodiments of the invention. The inverter circuit 510 receives a source line signal driven to the source line 340, inverts the source line signal, and transmits the inverted signal via a coupling trace 520 to the sensor electrode 420. In some embodiments, the inverted signal may be transmitted to a routing trace 422 coupled to the sensor electrode 420 instead of, or in addition to, transmitting the inverted signal to the sensor electrode 420 itself. In embodiments where the source line 340 and sensor electrode 420 and/or routing trace 422 are on different substrates or on opposite sides of the same substrate (e.g., substrate 410), the coupling trace 520 may include a through-connection (e.g., a via) that extends through a substrate. The inverter circuit 510 may further amplify and/or add a phase delay to the source line signal and/or the inverted signal prior to transmitting the inverted signal to the sensor electrode 420. For example, amplification and/or a phase delay may be applied to the source line signal and/or the inverted signal to more accurately align the waveform of the inverted signal to the waveform of the interference signal received by the sensor electrode 420 in order to cancel the interference signal.

In various embodiments, if a particular sensor electrode 420 is proximate to multiple source lines 340, then more than one source line 340 may be coupled to the receiver electrode via one or more inverter circuits 510. Additionally, if a particular source line 340 is proximate to multiple sensor electrodes 420, then more than one sensor electrode 420 may be coupled to the source line 340 via one or more inverter circuits 510. For example, in the embodiment shown in FIG. 4A, sensor electrode 420-1 may be coupled to both source line 340-1 and source line 340-2 via one or more inverter circuits 510 in order to compensate for interference received from both source line 340-1 and source line 340-2. Further, in the embodiments shown in FIGS. 4B and 4C, sensor electrode 420-1 may be coupled to both source line 340-1 and source line 340-2 via one or more inverter circuits 510. The amplification and/or phase delay applied to the source line signals and/or the inverted signals generated via source line 340-1 and source line 340-2 may then be selected to effectively cancel interference received by the sensor electrode 420-1 from each source line 340. More specifically, greater amplification may be applied to the inverted signal that is generated via source line 340-1, since source line 340-1 is closer to the sensor electrode 420-1—and, thus, is likely to generate a higher degree of interference in sensor electrode 420-1—than source line 340-2. In addition, the phase delay applied to the inverted signal that is generated via source line 340-1 may be selected based on the location at which the sensor electrode 420 is coupled to the source line 340 and/or on the proximity of the sensor electrode 420 (and/or the proximity of the routing trace 422 coupled to the sensor electrode 420) to the source line(s) 340. For example, if interference is transmitted between the sensor electrode 420 and the source line 340 at a location or locations that are different than the location(s) at which the sensor electrode 420 is coupled to the source line 340 (e.g., via the inverter circuit 510), then a phase delay may be applied to the inverted signal to compensate for resistance-capacitance (RC) delay(s) between the locations.

Figure 5B:
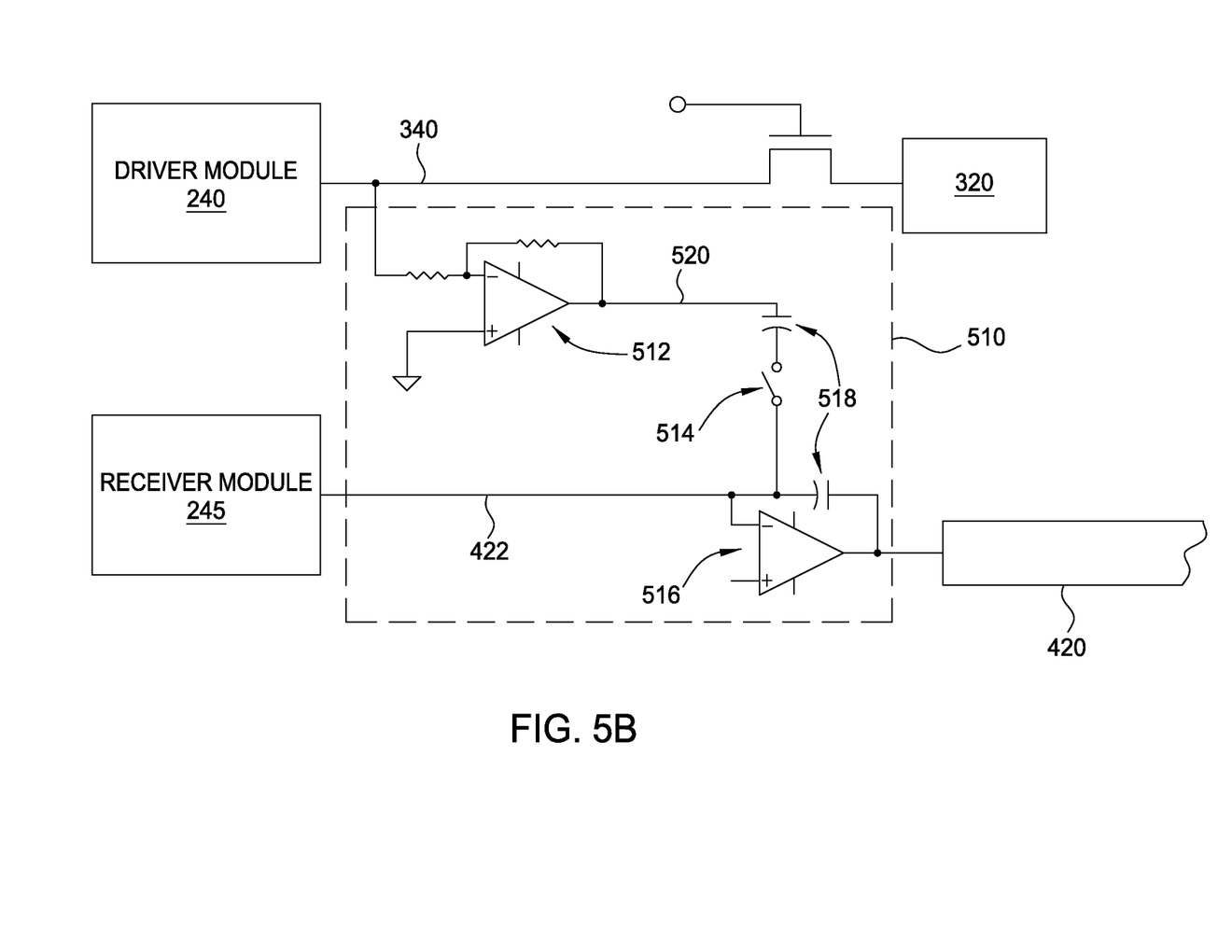
FIG. 5B illustrates a partial schematic diagram of the inverter circuit of FIG. 5A in accordance with embodiments of the invention.

Exemplary circuitry for performing signal inversion, amplification, and/or phase shifting is shown in FIG. 5B, which illustrates a partial schematic diagram of the inverter circuit 510 of FIG. 5A in accordance with embodiments of the invention. As shown, the inverter circuit 510 may include an inverter 512, a switch 514, an amplifier 516, and one or more capacitors 518. The inverter 512 is configured to receive a source line signal and generate an inverted signal. The inverted signal may have a phase that is inverted relative to the source line signal, enabling the inverted signal to cancel interference generated by a source line 340. The switch 514 is configured to couple the source line 340 to the sensor electrode 420 (e.g., via the routing trace 422) so that the inverted signal can be transmitted to the sensor electrode 420. The amplifier 516 is configured to apply a programmable gain to the inverted signal, for example, to match the amplitude of interference received from the source line 340 by the sensor electrode 420 and/or routing trace 422. In some embodiments, the programmable gain applied by the amplifier 516 may be determined empirically by increasing and/or decreasing the gain until interference generated by the source lines 340 is reduced to an appropriate level. In various embodiments, the switch 514 and the programmable gain applied by the amplifier 516 may be controlled by the processing system 110. For example, the processing system 110 may include a feedback mechanism that allows the processing system 110 to monitor source line 340 interference and, in response, modify the state of the switch 514 and/or the amplifier 516. The capacitance of the capacitors 518 may be selected and/or controlled to modify the amplitude of the inverted signal and/or modify the phase of the inverted signal. In addition, the inverter circuit 510 may include a filter, such as a RC delay filter, that is configured to add a phase delay to the source line signal and/or inverted signal.

Figure 6A:
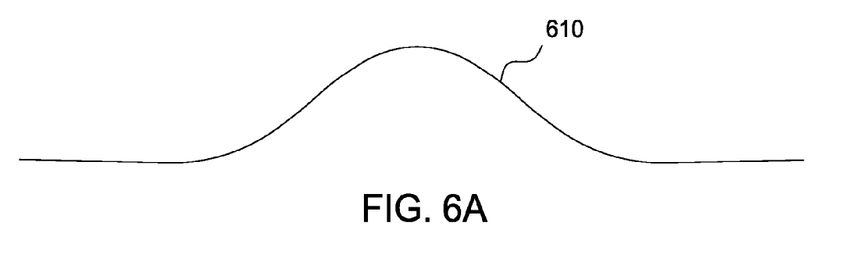
FIGS. 6A-6C illustrate the effect of transmitting an inverted signal to a receiver electrode to cancel an interference signal generated by a source line in accordance with embodiments of the invention.
Figure 6B:
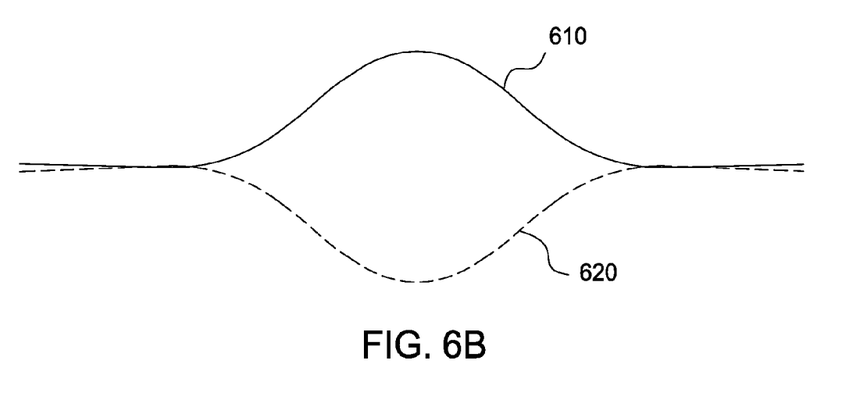
Figure 6C:
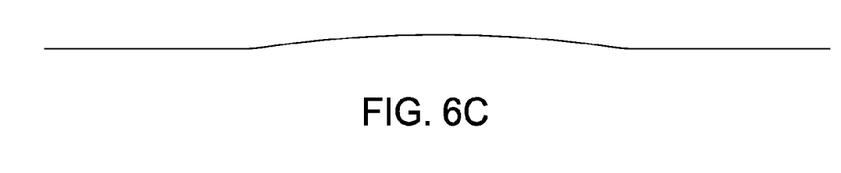

When an appropriate amplification and/or phase delay are applied via the inverter circuit 510, the inverted signal transmitted to the sensor electrode 420 may effectively cancel out at least a portion of the interference generated by the electromagnetic coupling between the source line(s) 340 and the sensor electrode 420. An example of interference compensation is shown in FIGS. 6A-6C, which illustrate the effect of transmitting an inverted signal 620 to a sensor electrode 420 to cancel an interference signal 610 generated by a source line 340 in accordance with embodiments of the invention. As shown, an interference signal 610 may be generated in a sensor electrode 420 by a source line signal driven onto a source line 340 that is proximate to the sensor electrode 420. The source line signal may then be transmitted to the inverter circuit 510 to generate an inverted signal 620. The inverted signal 620 is then transmitted to the sensor electrode 420, as shown in FIG. 6B. When an appropriate amplification and/or phase delay are applied to the inverted signal 620, the inverted signal 620 may have a similar amplitude and an opposite phase of the interference signal 610, enabling the inverted signal 620 to cancel the interference signal 610, as shown in FIG. 6C. Accordingly, by canceling interference received by the sensor electrodes 420 from the source lines 340, input sensing performance may be improved.

Figure 7:
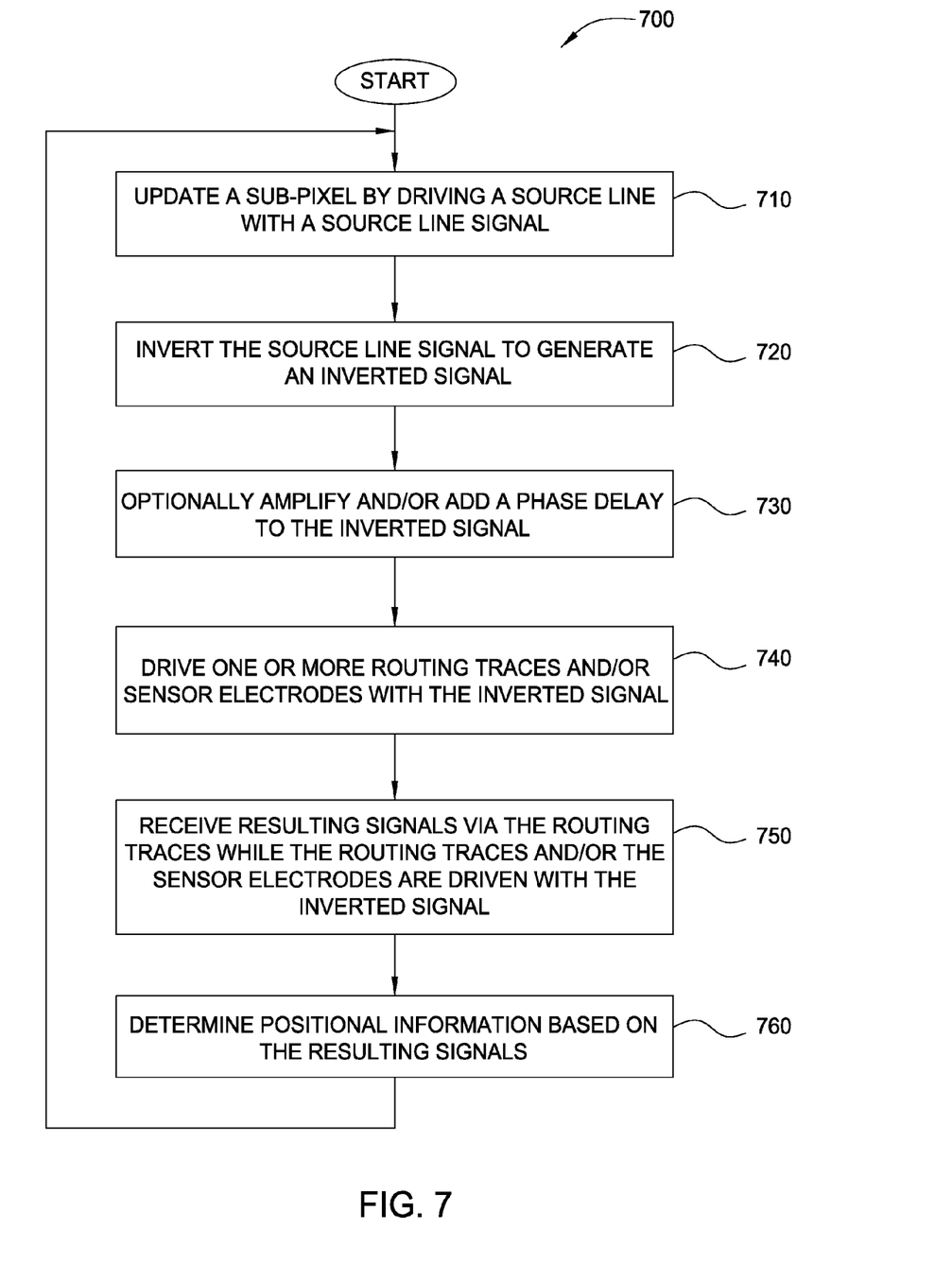
FIG. 7 is a flow chart of a method for mitigating electrode interference when performing display updating and input sensing with the input device in accordance with embodiments of the invention.

FIG. 7 is a flow chart of a method 700 for mitigating electrode interference when performing display updating and input sensing with the input device 100 in accordance with embodiments of the invention. Although the method 700 is described in conjunction with FIGS. 1-6C, persons skilled in the art will understand that any system configured to perform the method, in any appropriate order, falls within the scope of the present invention.

The method 700 begins at step 710, where the driver module 240 updates a sub-pixel by driving a source line 340 with a source line signal. Next, at step 720, the inverter circuit 510 receives the source line signal and generates an inverted signal. At step 730, the inverter circuit 510 (or another circuit) may amplify and/or add a phase delay to the inverted signal.

At step 740, the inverted signal is transmitted (e.g., via a coupling trace 520) to a routing trace 422 and/or sensor electrode 420 to cancel interference generated by the source line signal. The inverted signal may be transmitted to the routing trace 422 and/or the sensor electrode 420 while the transmitter electrodes 210 are transmitting input sensing signals. Then, at step 750, the processing system 110 receives resulting signals via the routing trace 222 while the routing trace 222 and/or sensor electrode 420 are driven with the inverted signal. Finally, at step 760, the determination module 250 determines positional information of an input object 140 based on the resulting signals. The method 700 then returns to step 710, where the next sub-pixel is driven for display updating by the driver module 240.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

The invention claimed is:

1. An input device comprising a display device having an integrated capacitive sensing device, the input device comprising:
a plurality of source lines;
a plurality of routing traces coupled to a plurality of sensor electrodes; and
a processing system coupled to the plurality of source lines and the plurality of routing traces, the processing system configured to:
update a first sub-pixel coupled to a first source line included in the plurality of source lines by driving the first source line with a first voltage;
drive one or more routing traces included in the plurality of routing traces with a second voltage, wherein the second voltage is an inverted version of the first voltage;
receive resulting signals from at least one sensor electrode included in the plurality of sensor electrodes via the one or more routing traces while the one or more routing traces are driven with the second voltage; and
determine positional information based on the resulting signals.

2. The input device of claim 1, wherein the plurality of routing traces are disposed on the same layer as the plurality of source lines.

3. The input device of claim 1, wherein the plurality of routing traces and the plurality of source lines are disposed on different layers of the input device, and the plurality of routing traces are substantially parallel to the plurality of source lines.

4. The input device of claim 1, wherein the processing system is configured to drive the second voltage with a phase delay relative to the first voltage.

5. The input device of claim 1, wherein the first source line is coupled to each of the one or more routing traces via one or more coupling traces, and the processing system is configured to drive the one or more routing traces with the second voltage via the one or more coupling traces.

6. The input device of claim 5, further comprising an inverter circuit coupled to the one or more coupling traces, wherein the inverter circuit is configured to generate the second voltage by inverting and modifying an amplitude of the first voltage.

7. The input device of claim 6, further comprising a filter coupled to the one or more coupling traces, wherein the filter is configured to generate the second voltage by adding a phase delay to the first voltage.

8. The input device of claim 1, wherein the processing system is further configured to drive a first sensor electrode included in the plurality of sensor electrodes with a transmitter signal, and the resulting signals comprise effects associated with the transmitter signal.

9. The input device of claim 1, wherein the processing system is further configured to drive the at least one sensor electrode included in the plurality of sensor electrodes with a modulated signal, and the resulting signals comprise effects associated with the modulated signal.

10. The input device of claim 1, wherein the second voltage is configured to cancel noise received from the first source line by the one or more sensor electrodes.

11. The input device of claim 1, wherein the processing system is further configured to:
update a second sub-pixel coupled to a second source line included in the plurality of source lines by driving the second source line with a third voltage;
drive at least one routing trace included in the one or more routing traces with a fourth voltage, wherein the fourth voltage is an inverted version of the third voltage; and
receive the resulting signals from the one or more sensor electrodes while the at least one routing trace is driven with the fourth voltage.

12. The input device of claim 1, wherein driving the one or more routing traces with the second voltage causes a modulated signal to be driven onto one or more sensor electrodes included in the plurality of sensor electrodes.

13. A method of input sensing with a display device having an integrated capacitive sensing device and including a plurality of source lines and a plurality of sensor electrodes, the method comprising:
updating a first sub-pixel coupled to a first source line included in the plurality of source lines by driving the first source line with a first voltage;
driving one or more sensor electrodes included in the plurality of sensor electrodes with a second voltage that is an inverted version of the first voltage;
receiving resulting signals from the one or more sensor electrodes while the one or more sensor electrodes are driven with the second voltage; and
determining positional information based on the resulting signals.

14. The method of claim 13, wherein driving the one or more sensor electrodes with the second voltage is performed by driving the second voltage with a phase delay relative to the first voltage.

15. The method of claim 13, further comprising coupling the first source line to each of the one or more sensor electrodes via one or more coupling traces, and wherein driving the one or more sensor electrodes with the second voltage is performed via the one or more coupling traces.

16. The method of claim 15, further comprising coupling an inverter circuit to the one or more coupling traces, and generating the second voltage by inverting and modifying an amplitude of the first voltage.

17. The method of claim 16, further comprising coupling a filter to the one or more coupling traces, and wherein generating the second voltage further comprises adding a phase delay to the first voltage with the filter.

18. The method of claim 13, further comprising driving a first sensor electrode included in the plurality sensor electrodes with a transmitter signal, and wherein the resulting signals comprise effects associated with the transmitter signal.

19. The method of claim 13, further comprising driving the one or more sensor electrodes with a modulated signal, and wherein the resulting signals comprise effects associated with the modulated signal.

20. The method of claim 13, further comprising:
updating a second sub-pixel coupled to a second source line included in the plurality of source lines by driving the second source line with a third voltage;
generating a fourth voltage by inverting the third voltage;
driving at least one sensor electrode included in the one or more sensor electrodes with the fourth voltage; and
receiving the resulting signals from the one or more sensor electrodes while the at least one sensor electrode is driven with the fourth voltage.

21. A processing system for a display device having an integrated sensing device, the processing system comprising:

a driver module comprising driver circuitry, the driver module coupled to a plurality of source lines and configured for updating a first sub-pixel coupled to a first source line included in the plurality of source lines by driving the first source line with a first voltage;

a sensor module coupled to a plurality of routing traces, each routing trace being coupled to a sensor electrode included in a plurality of sensor electrodes, the sensor module configured for receiving resulting signals with at least one sensor electrode included in the plurality of sensor electrodes via one or more routing traces included in the plurality of routing traces while the one or more routing traces are driven with the second voltage, wherein the second voltage is an inverted version of the first voltage; and a determination module configured for determining positional information based on the resulting signals.

22. The processing system of claim 21, wherein the driver module is configured for driving the one or more sensor electrodes with the second voltage, and the second voltage has a phase delay relative to the first voltage.

23. The processing system of claim 21, wherein:
the driver module is further configured for:
updating a second sub-pixel coupled to a second source line included in the plurality of source lines by driving the second source line with a third voltage; and
driving at least one sensor electrode included in the plurality of sensor electrodes with a fourth voltage, wherein the fourth voltage is generated by inverting the third voltage; and
the sensor module is further configured for receiving resulting signals from one or more sensor electrodes while the at least one sensor electrode is driven with the fourth voltage.

24. The processing system of claim 21, wherein the driver module is further configured to drive a first sensor electrode included in the plurality of sensor electrodes with a transmitter signal, and wherein the resulting signals comprise effects associated with the transmitter signal.

25. The processing system of claim 21, wherein the driver module is further configured to drive the at least one sensor electrode included in the plurality of sensor electrodes with a modulated signal, and wherein the resulting signals comprise effects associated with the modulated signal.

* * * * *